(12) United States Patent
Nakazawa et al.

(10) Patent No.: US 11,989,403 B2
(45) Date of Patent: May 21, 2024

(54) INFORMATION PROCESSING DEVICE AND INFORMATION PROCESSING METHOD

(71) Applicant: SINTOKOGIO, LTD., Nagoya (JP)

(72) Inventors: Kazuya Nakazawa, Nagoya (JP); Takahiro Naito, Nagoya (JP); Mitsuaki Watanabe, Nagoya (JP); Tomoyoshi Kawaguchi, Nagoya (JP); Naoya Sogo, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 17/581,009

(22) Filed: Jan. 21, 2022

(65) Prior Publication Data

US 2022/0236865 A1    Jul. 28, 2022

(30) Foreign Application Priority Data

Jan. 27, 2021 (JP) ................................ 2021-011237
Oct. 20, 2021 (JP) ................................ 2021-171936

(51) Int. Cl.
*G06F 3/04847* (2022.01)
*G05B 19/05* (2006.01)
*G06F 3/14* (2006.01)

(52) U.S. Cl.
CPC ....... *G06F 3/04847* (2013.01); *G05B 19/054* (2013.01); *G06F 3/14* (2013.01); *G05B 2219/1105* (2013.01); *G05B 2219/1214* (2013.01)

(58) Field of Classification Search
CPC ..... G06F 3/04847; G06F 3/14; G05B 19/054; G05B 2219/1105; G05B 2219/1214; G05B 19/0426
See application file for complete search history.

(56) References Cited

U.S. PATENT DOCUMENTS

| 8,063,750 | B2 | 11/2011 | Knibbe |
| 9,970,757 | B2 | 5/2018 | Das et al. |
| 10,387,392 | B2 * | 8/2019 | Bliss ..................... G06F 16/185 |

(Continued)

FOREIGN PATENT DOCUMENTS

| JP | 2007-27889 A | 2/2007 |
| JP | 2011-164966 A | 8/2011 |

(Continued)

OTHER PUBLICATIONS

U.S. Office Action for corresponding U.S. Appl. No. 17/582,268 dated Nov. 25, 2022.

(Continued)

*Primary Examiner* — Vijay Shankar
(74) *Attorney, Agent, or Firm* — Harness, Dickey & Pierce, P.L.C.

(57) ABSTRACT

Provided is an information processing device including at least one processor, the at least one processor executing a first obtaining process for obtaining accessory equipment data transmitted from each of pieces of accessory equipment included in an accessory equipment group, a first converting process for converting the accessory equipment data, which has been obtained in the first obtaining process, into a particular format, and a first providing process for providing, to main equipment, the accessory equipment data whose format has been converted in the first converting process.

9 Claims, 9 Drawing Sheets

| Word number of accessory equipment group data | Memory address of main equipment PLC |
|---|---|
| Head+01 | QQQ~Q' Q' Q' |
| Head+02 | RRR~R' R' R' |
| ⋮ | ⋮ |
| Comm.+001 | SSS~S' S' S' |
| Comm.+002 | TTT~T' T' T' |
| ⋮ | ⋮ |
| S_Data+001 | UUU~U' U' U' |
| S_Data+002 | VVV~V' V' V' |
| ⋮ | ⋮ |
| O_Data+001 | WWW~W' W' W' |
| O_Data+002 | XXX~X' X' X' |
| ⋮ | ⋮ |
| Mon.+001 | YYY~Y' Y' Y' |
| Mon.+002 | ZZZ~Z' Z' Z' |
| ⋮ | ⋮ |

M2

(56) References Cited

U.S. PATENT DOCUMENTS

| | | | |
|---|---|---|---|
| 10,754,329 B2 | 8/2020 | Jundt et al. | |
| 11,200,774 B2* | 12/2021 | Erestam | G07C 3/12 |
| 11,775,081 B2* | 10/2023 | Nakazawa | G06F 3/03 |
| | | | 715/771 |
| 2010/0231363 A1* | 9/2010 | Knibbe | H04L 12/2803 |
| | | | 340/286.02 |
| 2012/0208605 A1 | 8/2012 | Strauss et al. | |
| 2015/0192414 A1* | 7/2015 | Das | G01C 5/06 |
| | | | 73/384 |
| 2015/0251102 A1 | 9/2015 | Kuo | |
| 2017/0124633 A1 | 5/2017 | Natarajan et al. | |
| 2017/0141933 A1 | 5/2017 | Senda et al. | |
| 2017/0337226 A1 | 11/2017 | Bliss et al. | |
| 2018/0158314 A1 | 6/2018 | Larsson | |
| 2018/0217581 A1* | 8/2018 | Jundt | G05B 19/414 |
| 2018/0306609 A1 | 10/2018 | Agarwal et al. | |
| 2019/0088069 A1 | 3/2019 | Erestam | |
| 2019/0314243 A1 | 10/2019 | MacCallum et al. | |
| 2019/0333129 A1 | 10/2019 | Taniguchi | |
| 2020/0334763 A1 | 10/2020 | Luciani | |
| 2020/0405228 A1 | 12/2020 | Svanegaard et al. | |
| 2021/0073449 A1 | 3/2021 | Segev et al. | |
| 2022/0043702 A1 | 2/2022 | Haines | |
| 2022/0236713 A1* | 7/2022 | Nakazawa | G05B 19/054 |
| 2022/0236812 A1 | 7/2022 | Nakazawa et al. | |

FOREIGN PATENT DOCUMENTS

| | | |
|---|---|---|
| JP | 4766926 B2 | 9/2011 |
| JP | 2017-092792 A | 5/2017 |
| JP | 2018-536228 A | 12/2018 |
| WO | 2019/187115 A1 | 10/2019 |

OTHER PUBLICATIONS

Extended European Search Report for EP Application No. 22153409.2 dated Jun. 17, 2022.
Extended European Search Report for EP Application No. 22153413.4 dated Jun. 17, 2022.
Extended European Search Report for EP Application No. 22153281.5 dated Jun. 15, 2022.
Extended European Search Report for EP Application No. 22153296.3 dated Jun. 15, 2022.
U.S. Office Action for corresponding U.S. Appl. No. 17/582,121 mailed Mar. 14, 2024.
European Office Action for European Patent Application No. 22153281.5 mailed on Mar. 21, 2024.
European Office Action for European Patent Application No. 22153413.4 mailed on Mar. 21, 2024.
U.S. Office Action for corresponding U.S. Appl. No. 17/580,763 mailed Mar. 26, 2024.
Morreale, P., System design and analysis of a web-based application for sensor network data integration and real-time presentation, Mar. 1, 2009, 2009 3rd Annual IEEE Systems Conference, pp. 201-204 (Year: 2009).

* cited by examiner

FIG. 3

Sensor data set D1

| | Configuration information | Status information | | Output information | | Monitor information | |
|---|---|---|---|---|---|---|---|
| Head+00 | Communication information offset value | Comm.+000 | Keep-alive signal | Data+000 | First sensor slave unit data | Mon.+000 | First sensor slave unit determination result |
| Head+01 | Output information offset value | Comm.+001 | Reserve | Data+001 | First sensor slave unit data | Mon.+001 | First sensor slave unit threshold value |
| ... | ... | Comm.+002 | Sensor master unit communication status | ... | ... | ... | ... |
| Head+11 | Sensor master unit code | ... | ... | Data+004 | Second sensor slave unit data | Mon.+009 | Second sensor slave unit determination result |
| ... | ... | Comm.+013 | First sensor slave unit communication status | ... | ... | ... | ... |
| Head+30 | First sensor slave unit code | ... | ... | | | | |
| ... | ... | | | | | | |

| Word number of sensor group data | Memory address of main equipment PLC |
|---|---|
| Head+01 | AAA~A'A'A' |
| Head+02 | BBB~B'B'B' |
| ⋮ | ⋮ |
| Comm.+001 | CCC~C'C'C' |
| Comm.+002 | DDD~D'D'D' |
| ⋮ | ⋮ |
| Data+001 | EEE~E'E'E' |
| Data+002 | FFF~F'F'F' |
| ⋮ | ⋮ |
| Mon.+001 | GGG~G'G'G' |
| Mon.+002 | HHH~H'H'H' |
| ⋮ | ⋮ |

FIG. 5

Equipment data set D2

| | Configuration information | Status information | | Output information | | Input information | | Monitor information | |
|---|---|---|---|---|---|---|---|---|---|
| Head+00 | Status information offset value | Comm.+000 | Keep-alive signal | S_Data+000 | Accessory equipment integrated information | O_Data+000 | Accessory equipment integrated command | Mon.+000 | First accessory equipment determination result |
| Head+01 | Output information offset value | Comm.+001 | Low battery signal | S_Data+001 | First accessory equipment operation information | O_Data+001 | First accessory equipment command signal | Mon.+001 | First accessory equipment threshold value |
| ... | Number of pieces of accessory equipment | Comm.+002 | First accessory equipment use status | ... | | ... | | ... | |
| Head+11 | First accessory equipment code | ... | | S_Data+003 | First accessory equipment analog output | O_Data+003 | First accessory equipment command value | Mon.+017 | Second accessory equipment determination result |
| Head+12 | ... | | | ... | | ... | | Mon.+018 | Second accessory equipment threshold value |

FIG. 6

| Word number of accessory equipment group data | Memory address of main equipment PLC |
|---|---|
| Head+01 | QQQ~Q'Q'Q' |
| Head+02 | RRR~R'R'R' |
| ⋮ | ⋮ |
| Comm.+001 | SSS~S'S'S' |
| Comm.+002 | TTT~T'T'T' |
| ⋮ | ⋮ |
| S_Data+001 | UUU~U'U'U' |
| S_Data+002 | VVV~V'V'V' |
| ⋮ | ⋮ |
| O_Data+001 | WWW~W'W'W' |
| O_Data+002 | XXX~X'X'X' |
| ⋮ | ⋮ |
| Mon.+001 | YYY~Y'Y'Y' |
| Mon.+002 | ZZZ~Z'Z'Z' |
| ⋮ | ⋮ |

M2

INFORMATION PROCESSING DEVICE AND INFORMATION PROCESSING METHOD

This Nonprovisional application claims priority under 35 U.S.C. § 119 on Patent Application No. 2021-011237 filed in Japan on Jan. 27, 2021 and on Patent Application No. 2021-171936 filed in Japan on Oct. 20, 2021, the entire contents of which are hereby incorporated by reference.

TECHNICAL FIELD

The present invention relates to an information processing device and an information processing method.

BACKGROUND ART

In a production site, a technique is used in which a programmable logic controller (PLC) incorporated in main equipment is operated based on equipment data transmitted from a plurality of pieces of accessory equipment. As a form of connecting the plurality of pieces of accessory equipment to the main equipment, a form of connecting a plurality of pieces of accessory equipment to main equipment via a relay device is known, as well as a form of connecting a plurality of pieces of accessory equipment directly to main equipment.

For example, Patent Literature 1 discloses an information processing system in which a relay unit is provided between a master unit and a plurality of slave units. The relay unit disclosed in Patent Literature 1 includes a communication interface for connecting to the master unit and a communication interface for connecting to the slave units. The relay unit relays information communication from the master unit to the slave unit or from the slave unit to the master unit via buses connected to the communication interfaces.

CITATION LIST

Patent Literature

[Patent Literature 1]
Japanese Patent Application Publication, Tokukai, No. 2007-27889

SUMMARY OF INVENTION

Technical Problem

A plurality of pieces of accessory equipment manufactured by various companies may be connected to main equipment. However, according to the information processing system disclosed in Patent Literature 1, the master unit identifies, based on a transmitted data address, which slave unit has transmitted input data, and then stores and/or uses the data. In such an information processing system, each time new accessory equipment is introduced, it has been necessary to prepare a program to execute a converting process corresponding to a format of equipment data transmitted from that accessory equipment, and to install the program in the PLC of the main equipment. As a result, introduction of new accessory equipment has been a heavy burden for users.

An object of an aspect of the present invention is to provide an information processing device capable of reducing a burden on a user at the time of set-up.

Solution to Problem

In order to attain the object, an information processing device in accordance with an aspect of the present invention includes at least one processor, the at least one processor executing a first obtaining process for obtaining accessory equipment data transmitted from each of pieces of accessory equipment included in an accessory equipment group, a first converting process for converting the accessory equipment data, which has been obtained in the first obtaining process, into a particular format, and a first providing process for providing, to main equipment, the accessory equipment data whose format has been converted in the first converting process.

Advantageous Effects of Invention

According to an aspect of the present invention, it is possible to provide the information processing device capable of reducing a burden on a user at the time of set-up.

BRIEF DESCRIPTION OF DRAWINGS

FIG. 3 is a diagram illustrating a configuration of sensor data stored in a memory of the information processing device illustrated in FIG. 1.

FIG. 4 is a diagram illustrating a configuration of a sensor address map stored in the memory of the information processing device illustrated in FIG. 1.

FIG. 5 is a diagram illustrating a configuration of equipment data stored in the memory of the information processing device illustrated in FIG. 1.

FIG. 6 is a diagram illustrating a configuration of an equipment address map of equipment data stored in the memory of the information processing device illustrated in FIG. 1.

DESCRIPTION OF EMBODIMENTS

An information processing device in accordance with the present application is a device for relaying communication between sensors included in a sensor group and main equipment, and relaying communication between pieces of accessory equipment included in an accessory equipment group and the main equipment. The following description will discuss details of an information processing device in accordance with the present embodiment with reference to the drawings.

(Appearance of Information Processing Device)

Figure 1:
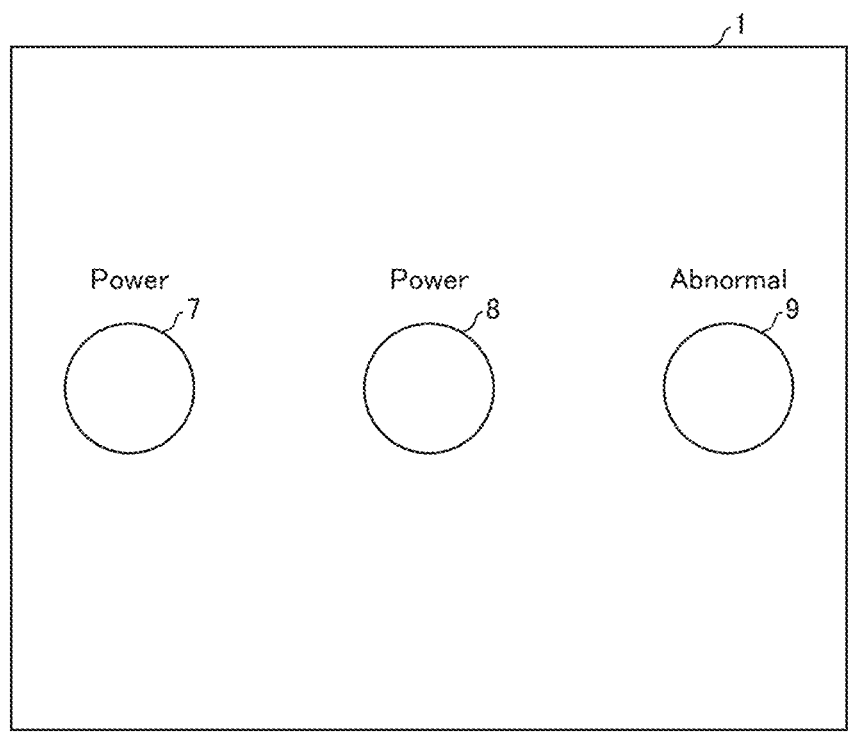
FIG. 1 is a front view illustrating an appearance of an information processing device in accordance with an embodiment of the present invention.

The following description will discuss an appearance of an information processing device 1 in accordance with an embodiment of the present invention with reference to FIG. 1. FIG. 1 is a front view illustrating an appearance of the information processing device 1.

As illustrated in FIG. 1, the information processing device 1 includes a power source button 7, a power source pilot lamp 8, and an abnormality pilot lamp 9.

The power source button 7 is a button for starting or stopping the information processing device 1. When a user presses the power source button 7 in a state in which the information processing device 1 is stopped, the information processing device 1 starts operating. When the user presses the power source button 7 in a state in which the information processing device 1 is in operation, the information processing device 1 stops. The power source pilot lamp 8 is a pilot lamp for indicating that the information processing device 1 is in operation. In a state in which the information processing device 1 is in operation, the power source pilot lamp 8 is on. In a state in which the information processing device 1 is stopped, the power source pilot lamp 8 is off. The abnormality pilot lamp 9 is a pilot lamp for indicating that an abnormality is occurring in the information processing device 1. In a state in which the information processing device 1 is in normal operation, the abnormality pilot lamp 9 is off. In a state in which the information processing device 1 is not in normal operation, the abnormality pilot lamp 9 is on. The abnormality pilot lamp 9 can be configured to be turned on when an abnormality occurs in the sensor or the accessory equipment that is connected to the information processing device 1.

(Configuration of Information Processing System Including Information Processing Device)

Figure 2:
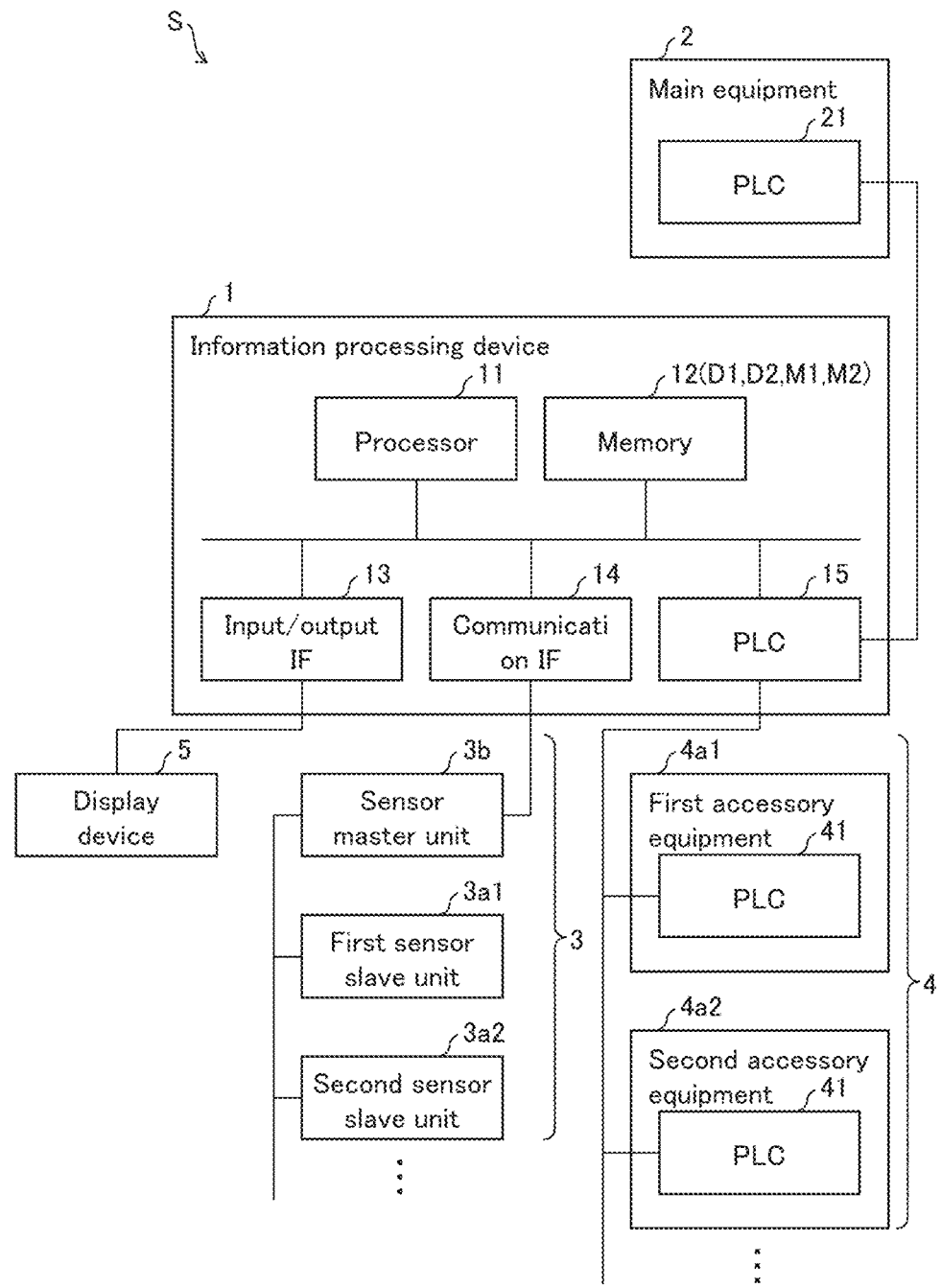
FIG. 2 is a block diagram illustrating a configuration of the information processing device illustrated in FIG. 1 and peripheral devices thereof.

The following description will discuss a configuration of an information processing system S including the information processing device 1 with reference to FIG. 2. FIG. 2 is a block diagram illustrating the configuration of the information processing system S.

The information processing system S includes main equipment 2, a sensor group 3, an accessory equipment group 4, and a display device 5 in addition to the information processing device 1.

The main equipment 2 is a device which plays a main role in a production line. The main equipment 2 can be, for example, a molding machine for forming a mold. The main equipment 2 includes a programmable logic controller (PLC) 21. The PLC 21 controls components of the main equipment 2 based on sensor data obtained, via the information processing device 1, from sensors constituting the sensor group 3 and based on pieces of equipment data obtained, via the information processing device 1, from pieces of accessory equipment constituting the accessory equipment group 4.

The sensor group 3 includes a plurality of sensor slave units 3a1, 3a2, . . . (an example of "sensors" in claims) and a sensor master unit 3b. Hereinafter, when the sensor slave units 3a1, 3a2, . . . are not individually identified, the sensor slave unit is referred to as "sensor slave unit 3a".

The sensor slave unit 3a is a device for detecting surrounding statuses of the sensor slave unit 3a, e.g., a status of the main equipment 2, a surrounding status of the main equipment 2, a status of accessory equipment 4a, a surrounding status of the accessory equipment 4a, a status of a raw material, a status of an intermediate product, or a status of a product. The sensor slave unit 3a can be, for example, an open/close sensor, a temperature sensor, PATLITE (registered trademark), or the like. The sensor slave unit 3a transmits, to the sensor master unit 3b, a detection value of the sensor slave unit 3a along with status information of the sensor slave unit 3a as sensor data. Here, the status information of the sensor slave unit 3a indicates, for example, a usage status of the sensor slave unit 3a, presence or absence of a monitoring function, a communication status, radio field intensity, or a remaining battery capacity. The sensor slave unit 3a is wirelessly connected to the sensor master unit 3b via, for example, EnOcean (registered trademark), ZigBee (registered trademark), Bluetooth Low Energy (registered trademark), or the like.

Note that there is a sensor device which has a plurality of sensor functions, e.g., a temperature/humidity sensor which detects both a temperature and humidity. In this case, each of sensor functions of a sensor device is dealt with as the sensor slave unit 3a. Therefore, a plurality of sensor slave units 3a can correspond to a single sensor device.

The sensor master unit 3b is a device for relaying communication between each of the sensor slave units 3a and the information processing device 1. The sensor master unit 3b transmits, to the information processing device 1, detection values and status information of the sensor slave units 3a that are connected to the sensor master unit 3b along with status information of the sensor master unit 3b as sensor data. Here, the status information of the sensor master unit 3b indicates, for example, a communication status and the number of times of data obtainment of the sensor master unit 3b. The sensor master unit 3b is connected to the information processing device 1 via wired connection by, for example, Ethernet (registered trademark).

The accessory equipment group 4 is constituted by a plurality of pieces of accessory equipment 4a1, 4a2, and so forth. Hereinafter, when the pieces of accessory equipment 4a1, 4a2, . . . are not individually identified, the accessory equipment is referred to as "accessory equipment 4a".

The accessory equipment 4a is a device for assisting the main equipment 2. The accessory equipment 4a can be, for example, a conveyor, a cylinder, a dust collector, or the like. The accessory equipment 4a includes a PLC 41. The PLC 41 of each of pieces of accessory equipment 4a controls components of that accessory equipment 4a. The PLC 41 of each of the pieces of accessory equipment 4a transmits, to the information processing device 1, digital output and analog output of that accessory equipment 4a along with status information of that accessory equipment 4a as equipment data. Here, the digital output of the accessory equipment 4a is also called "operation signal" and indicates, for example, whether or not automatic operation is available, whether or not the equipment is in automatic operation, whether or not an abnormality is occurring, or whether or not the equipment is in emergency stop. The analog output of the accessory equipment 4a indicates, for example, a feeding speed of a conveyor, operation pressure of a cylinder, an airflow rate of a dust collector, power consumption, or the like. The status information of the accessory equipment 4a indicates, for example, a usage status of the accessory equipment 4a, presence or absence of a monitoring function, or a communication status. The accessory equipment 4a is connected to the information processing device 1 via wired connection by, for example, CC-Link (registered trademark).

The information processing device 1 is a device for relaying communication between the main equipment 2 and the sensor group 3, and communication between the main equipment 2 and the accessory equipment group 4. The information processing device 1 includes a processor 11, a memory 12, an input/output IF 13, a communication IF 14, and a PLC 15, as illustrated in FIG. 2. The processor 11, the memory 12, the input/output IF 13, the communication IF 14, and the PLC 15 are connected to each other via buses.

The information processing device 1 can be realized, for example, by adding the PLC 15 to a small single board computer such as Raspberry Pi (registered trademark).

In the memory 12, a sensor data set D1, an equipment data set D2, a sensor address map M1, and an equipment address map M2 are stored together with an information processing program P. The processor 11 refers to the sensor data set D1, the equipment data set D2, the sensor address map M1, and the equipment address map M2, and executes an information processing method (described later) in accordance with the information processing program P. Examples of devices that can be used as the processor 11 include a central processing unit (CPU). Examples of devices that can be used as the memory 12 include a flash memory.

The input/output IF 13 is an interface for connecting the display device 5. As the input/output IF 13, for example, high-definition multimedia interface (HDMI) (registered trademark) is used. The communication IF 14 is an interface for communicating with the sensor master unit 3*b*. For example, an Ethernet interface is used as the communication IF 14. The PLC 15 is a controller for communicating with (the PLC 21 of) the main equipment 2 and (the PLC 41 of) the accessory equipment 4*a*. The PLC can access the equipment data set D2 and the equipment address map M2 via the busses. The PLC 15 is connected to (the PLC 21 of) the main equipment 2 and to (the PLC 41 of) the accessory equipment 4*a* by CC-Link.

(Configurations of Sensor Data Set and Sensor Address Map)

A configuration of the sensor data set D1 stored in the memory 12 of the information processing device 1 will be described with reference to FIG. 3. FIG. 3 is a diagram illustrating the configuration of the sensor data set D1.

As illustrated in FIG. 3, the sensor data set D1 is constituted by configuration information 91, status information 92, output information 93, and monitor information 94. Pieces of information constituting the configuration information 91, the status information 92, the output information 93, and the monitor information 94 are managed with consecutive word numbers. In FIG. 3, a leading portion of word number of the configuration information 91 is "Head", a leading portion of word number of the status information 92 is "Comm.", a leading portion of word number of the output information 93 is "Data", and a leading portion of word number of the monitor information 94 is "Mon.", and each of the leading portions indicates content of information corresponding to that word number.

The configuration information 91 is information indicating a configuration of the sensor group 3. The configuration information 91 includes, for example, the number of sensor master units 3*b*, a type code and an IP address of each sensor master unit 3*b*, the number of sensor slave units 3*a* connected to each sensor master unit 3*b*, the total number of sensor slave units 3*a*, and a type code of each sensor slave unit 3*a*. For example, the configuration information 91 may be set by a manufacturer prior to shipment of the information processing device 1, or may be set by a user after shipment of the information processing device 1. An offset value of a leading word number of each of the status information 92, the output information 93, and the monitor information 94 (i.e., a difference from a leading word number of the configuration information 91), system information of the information processing device 1, and the like may be included in the configuration information 91.

The status information 92 is a set of status information of each of the sensor slave units 3*a* and status information of the sensor master unit 3*b*. The status information of each of the sensor slave units 3*a* is, as described above, obtained from that sensor slave unit 3*a* via the sensor master unit 3*b* as sensor data. The status information of the sensor master unit 3*b* is obtained from the sensor master unit 3*b* as described above. The status information 92 may include a keep-alive signal of the information processing system S, sensor slave unit integrated information in which pieces of status information of all the sensor slave units 3*a* are integrated, and/or the like. The sensor slave unit integrated information includes, for example, information indicating whether or not communication statuses of all the sensor slave units 3*a* are normal, and information indicating whether or not remaining battery capacities of all the sensor slave units 3*a* are normal.

The output information 93 is a set of detection values of the sensor slave units 3*a*. The detection value of each of the sensor slave units 3*a* is obtained as sensor data from that sensor slave unit 3*a*, as described above.

The monitor information 94 is a set of a determination condition and a determination result pertaining to each of the sensor slave units 3*a*. The determination condition pertaining to each of the sensor slave units 3*a* is represented, for example, by a threshold value. In this case, the determination result pertaining to each of the sensor slave units 3*a* is given as a result of comparing the detection value of that sensor slave unit 3*a* with the threshold value. The determination condition pertaining to each of the sensor slave units 3*a* may be set by a manufacturer prior to shipment of the information processing device 1, or may be set by a user after shipment of the information processing device 1. The determination result pertaining to each of the sensor slave units 3*a* is derived from the information processing device 1 each time the detection value of that sensor slave unit 3*a* is updated.

A configuration of the sensor address map M1 as address information stored in the memory 12 of the information processing device 1 will be described with reference to FIG. 4. FIG. 4 is a diagram illustrating the configuration of the sensor address map M1.

The sensor address map M1 is a table in which word numbers assigned to respective pieces of information included in the sensor data set D1 are associated with addresses on a memory of the PLC 21 provided in the main equipment 2.

The processor 11 of the information processing device 1 reads out pieces of information included in the sensor data set D1 as the configuration information 91, the status information 92, the output information 93, and the monitor information 94 from the memory 12 of the information processing device 1, and writes the information to the memory of the PLC 21 provided in the main equipment 2. At this time, the processor 11 of the information processing device 1 determines, in accordance with the sensor address map M1, a region on the memory of the PLC 21 to which each piece of information is to be written. For example, in the sensor address map M1, a word number Data+001 is associated with addresses EEE through E'E'E'. Therefore, the processor 11 of the information processing device 1 writes detection values of a first sensor slave unit, to which the word number Data+001 is assigned in the sensor data set D1, to regions to which the addresses EEE through E'E'E' are assigned in the memory of the PLC 21.

The processor 11 of the information processing device 1 may write sensor data obtained from the sensors constituting the sensor group 3 to the memory of the PLC 21 provided in the main equipment 2 in accordance with the information processing program P. In this case, address information equivalent to the foregoing sensor address map M1 is included inside the information processing program P.

(Configurations of Equipment Data Set and Equipment Address Map)

A configuration of the equipment data set D2 stored in the memory 12 of the information processing device 1 will be described with reference to FIG. 5. FIG. 5 is a diagram illustrating the configuration of the equipment data set D2.

As illustrated in FIG. 5, the equipment data set D2 is constituted by configuration information 95, status information 96, output information 97, input information 98, and monitor information 99. Pieces of information constituting the configuration information 95, the status information 96, the output information 97, the input information 98, and the monitor information 99 are managed with consecutive word numbers. In FIG. 5, a leading portion of word number of the configuration information 95 is "Head", a leading portion of word number of the status information 96 is "Comm.", a leading portion of word number of the output information 97 is "S_data", a leading portion of word number of the input information 98 is "O_data", and a leading portion of word number of the monitor information 99 is "Mon.", and each of the leading portions indicates content of information corresponding to that word number.

The configuration information 95 is information indicating a configuration of the accessory equipment group 4. The configuration information 95 includes, for example, the number of pieces of the accessory equipment 4a and a type code of each piece of the accessory equipment 4a. An offset value of a leading word number of each of the status information 96, the output information 97, the input information 98, and the monitor information 99 (i.e., a difference from a leading word number of the configuration information 95), system information of the information processing device 1, and the like may be included in the configuration information 95.

The status information 96 is a set of pieces of status information of the pieces of accessory equipment 4a. The status information of each piece of the accessory equipment 4a is obtained as the equipment data from that piece of accessory equipment 4a, as described above. The status information 96 may include a keep-alive signal of the information processing system S, a low battery signal of the information processing device 1, and/or the like.

The output information 97 is a set of digital output and analogue output of each piece of the accessory equipment 4a. The digital output and analogue output of each piece of the accessory equipment 4a are obtained as the equipment data from that piece of accessory equipment 4a, as described above. The output information 97 may include accessory equipment integrated information in which digital outputs (operation signals) of all pieces of the accessory equipment 4a are integrated. The accessory equipment integrated information includes, for example, information indicating whether or not all pieces of accessory equipment 4a are normal, and information indicating whether or not all pieces of the accessory equipment 4a can be automatically operated.

The input information 98 is a set of digital input and analog input of each piece of the accessory equipment 4a. The digital input of each piece of the accessory equipment 4a is also called "command signal", and represents a command to that piece of accessory equipment 4a. The analog input of each piece of the accessory equipment 4a is also called "command value", and represents a command value to that piece of accessory equipment 4a. The digital input and analog input of each piece of the accessory equipment 4a are obtained from the PLC 21 of the main equipment 2. The input information 98 may include an accessory equipment integrated command in which command signals for all pieces of the accessory equipment 4a are integrated. The accessory equipment integrated command includes, for example, an auto-start command for all pieces of accessory equipment that gives an instruction on auto-start to all pieces of the accessory equipment 4a, and an auto-stop command for all pieces of accessory equipment that gives an instruction on auto-stop to all pieces of the accessory equipment 4a.

The monitor information 99 is a set of a determination condition and a determination result pertaining to each piece of the accessory equipment 4a. The determination condition pertaining to each piece of the accessory equipment 4a is represented, for example, by a threshold value. In this case, the determination result pertaining to each piece of the accessory equipment 4a is given as a result of comparing the digital output of that piece of accessory equipment 4a with the threshold value. The determination condition pertaining to each piece of the accessory equipment 4a may be set by a manufacturer prior to shipment of the information processing device 1, or may be set by a user after shipment of the information processing device 1. The determination result pertaining to each piece of the accessory equipment 4a is derived by the information processing device 1 each time the digital output of that piece of accessory equipment 4a is updated. A determination record pertaining to each piece of the accessory equipment 4a may be included in the monitor information 99. The determination record pertaining to each piece of the accessory equipment 4a includes, for example, the number of times the determination result pertaining to that piece of accessory equipment 4a has become true.

A configuration of the equipment address map M2 as address information stored in the memory 12 of the information processing device 1 will be described with reference to FIG. 6. FIG. 6 is a diagram illustrating the configuration of the equipment address map M2.

The equipment address map M2 is a table in which word numbers assigned to respective pieces of information included in the equipment data set D2 are associated with addresses on a memory of the PLC 21 provided in the main equipment 2.

The processor 11 of the information processing device 1 reads out pieces of information included in the equipment data set D2 as the configuration information 95, the status information 96, the output information 97, and the monitor information 99 from the memory 12 of the information processing device 1, and writes the information to the memory of the PLC 21 provided in the main equipment 2. At this time, the processor 11 of the information processing device 1 determines, in accordance with the equipment address map M2, a region on the memory of the PLC 21 to which each piece of information is to be written. For example, in the equipment address map M2, a word number S_S_Data+001 is associated with addresses UUU through U'U'U'. Therefore, the processor 11 of the information processing device 1 writes digital output of first accessory equipment, to which the word number S_Data+001 is assigned in the equipment data set D2, to regions to which the addresses UUU through U'U'U' are assigned in the memory of the PLC 21.

In addition, the processor 11 of the information processing device 1 reads out pieces of information included in the equipment data set D2 as the input information 98 from the memory of the PLC 21 provided in the main equipment 2, and writes the read information to the memory 12 of the information processing device 1. At this time, the processor

11 of the information processing device 1 determines, in accordance with the equipment address map M2, a region on the memory of the PLC 21 from which each piece of information is to be read out. For example, in the equipment address map M2, a word number O_Data+001 is associated with addresses WWW through W'W'W. Therefore, the processor 11 of the information processing device 1 reads out digital input of first accessory equipment, to which the word number O_Data+001 is assigned in the sensor data set D1, from regions to which the addresses WWW through W'W'W' are assigned in the memory of the PLC 21.

The processor 11 of the information processing device 1 may write pieces of equipment data obtained from the pieces of accessory equipment constituting the accessory equipment group 4 to the memory of the PLC 21 provided in the main equipment 2 in accordance with the information processing program P. In this case, address information corresponding to the foregoing equipment address map M2 is included inside the information processing program P.

(Sensor Data Relaying Method)

Figure 7:
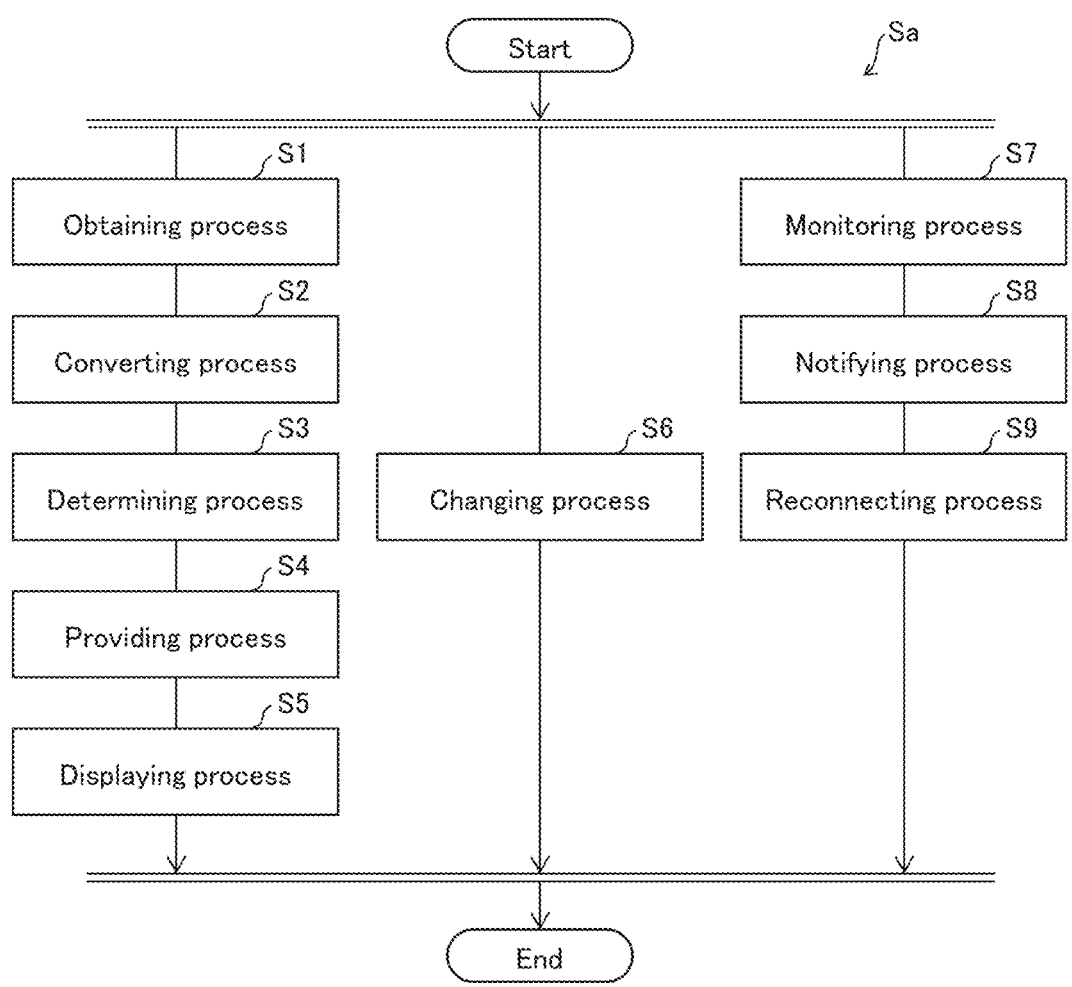
FIG. 7 is a flowchart showing a method for relaying sensor data by the information processing device illustrated in FIG. 1.

A method Sa for relaying sensor data in the information processing device 1 will be described with reference to FIG. 7. FIG. 7 is a flowchart showing a method Sa for relaying sensor data.

The method Sa for relaying sensor data includes an obtaining process S1, a converting process S2, a determining process S3, a providing process S4, and a displaying process S5, as shown in FIG. 7.

The obtaining process S1 is a process in which the processor 11 of the information processing device 1 obtains sensor data transmitted from the sensor slave units 3a constituting the sensor group 3. In the obtaining process S1, the sensor slave unit 3a transmits sensor data to the sensor master unit 3b periodically or each time a detection value changes. Further, the sensor master unit 3b transmits the sensor data received from the sensor slave unit 3a to the information processing device 1 periodically or each time the sensor master unit 3b receives sensor data from the sensor slave unit 3a. The processor 11 of the information processing device 1 receives the sensor data transmitted from the sensor slave unit 3a.

The converting process S2 is a process for converting sensor data obtained in the obtaining process S1 into a particular format that is interpretable to the PLC 21 of the main equipment 2. In the converting process S2, the processor 11 of the information processing device 1 extracts status information and a detection value of the sensor slave unit 3a from sensor data obtained in the obtaining process S1. In addition, the processor 11 of the information processing device 1 converts the extracted status information into a format that is interpretable to the PLC 21 of the main equipment 2, and then writes the converted information to the memory 12 as the status information 92 of the sensor data set D1. The processor 11 of the information processing device 1 converts the extracted detection value into a format that is interpretable to the PLC 21 of the main equipment 2, and then writes the converted value to the memory 12 as the output information 93 of the sensor data set D1. For example, in a case where sensor data of "55:0:07:02:0a:0a:21:05:1c:fc:a6:09:b8:01:37:90" is obtained from a certain sensor, the processor 11 converts information pertaining to the detection value in the obtained sensor data into "1" and converts information pertaining to the status information in the obtained sensor data into "RSSI-55".

The determining process S3 is a process for determining whether or not the sensor data obtained in the obtaining process S1 satisfies a particular condition. In the determining process S3, the processor 11 of the information processing device 1 (1) compares the detection value of the sensor slave unit 3a written to the memory 12 as the output information 93 of the sensor data set D1 with the threshold value written to the memory 12 as the monitor information 94 of the sensor data set D1, and (2) writes a comparison result to the memory 12 as the monitor information 94 of the sensor data set D1.

The providing process S4 is a process for providing, to the main equipment 2, sensor data whose format has been converted in the converting process S2. In the providing process S4, the processor 11 of the information processing device 1 reads out pieces of information constituting the status information 92, the output information 93, and the monitor information 94 of the sensor data set D1, and writes the read information to the memory of the PLC 21 provided in the main equipment 2. At this time, the processor 11 of the information processing device 1 determines, with reference to the sensor address map M1, which information is to be written to which region of the memory of the PLC 21.

The displaying process S5 is a process for displaying, on the display device 5, sensor data obtained in the obtaining process S1 or information obtained from the sensor data. In the displaying process S5, the processor 11 of the information processing device 1 generates a sensor display screen for displaying sensor data. The processor 11 of the information processing device 1 outputs the generated sensor display screen to the display device 5. A specific example of the sensor display screen will be described later with reference to another drawing.

As illustrated in FIG. 7, the processor 11 of the information processing device 1 may further execute a changing process S6 for changing a condition used for the determining process S3 based on a user operation. In the changing process S6, the processor 11 of the information processing device 1 changes the threshold value stored in the memory 12 as the monitor information 94 of the sensor data set D1 to a value specified by the user.

The processor 11 of the information processing device 1 may further execute a monitoring process S7, a notifying process S8, and a reconnecting process S9, as illustrated in FIG. 7.

The monitoring process S7 is a process in which the processor 11 of the information processing device 1 monitors a data transmission interval of each of the sensor slave units 3a included in the sensor group 3. In the monitoring process S7, the processor 11 of the information processing device 1 monitors intervals of data transmission from the sensor master unit 3b. The processor 11 monitors the data transmission interval based on the status information 92 of the sensor data set D1 stored in the memory 12. In a case where the data transmission interval of the sensor master unit 3b exceeds a particular period, the processor 11 determines that connection with the sensor master unit 3b is erroneous.

The notifying process S8 is a process for giving notification of a connection error in a case where the data transmission interval of the sensor master unit 3b monitored in the monitoring process S7 exceeds the particular period. In a case where it is determined in the monitoring process S7 that connection with the sensor master unit 3b is erroneous, the processor 11 of the information processing device 1 causes the display device 5 to display notification of a connection error in the notifying process S8.

The reconnecting process S9 is a process in which the processor 11 of the information processing device 1 attempts to reconnect to the sensor master unit 3b when communication with the sensor master unit 3b has been shut off. In the reconnecting process S9, the processor 11 of the information processing device 1 executes reconnection to the sensor master unit 3b for which a connection error has been determined in the monitoring process S7. The processor 11 of the information processing device 1 repeats the reconnecting process S9 until the processor 11 is connected to the sensor master unit 3b.

(Equipment Data Relaying Method)

Figure 8:
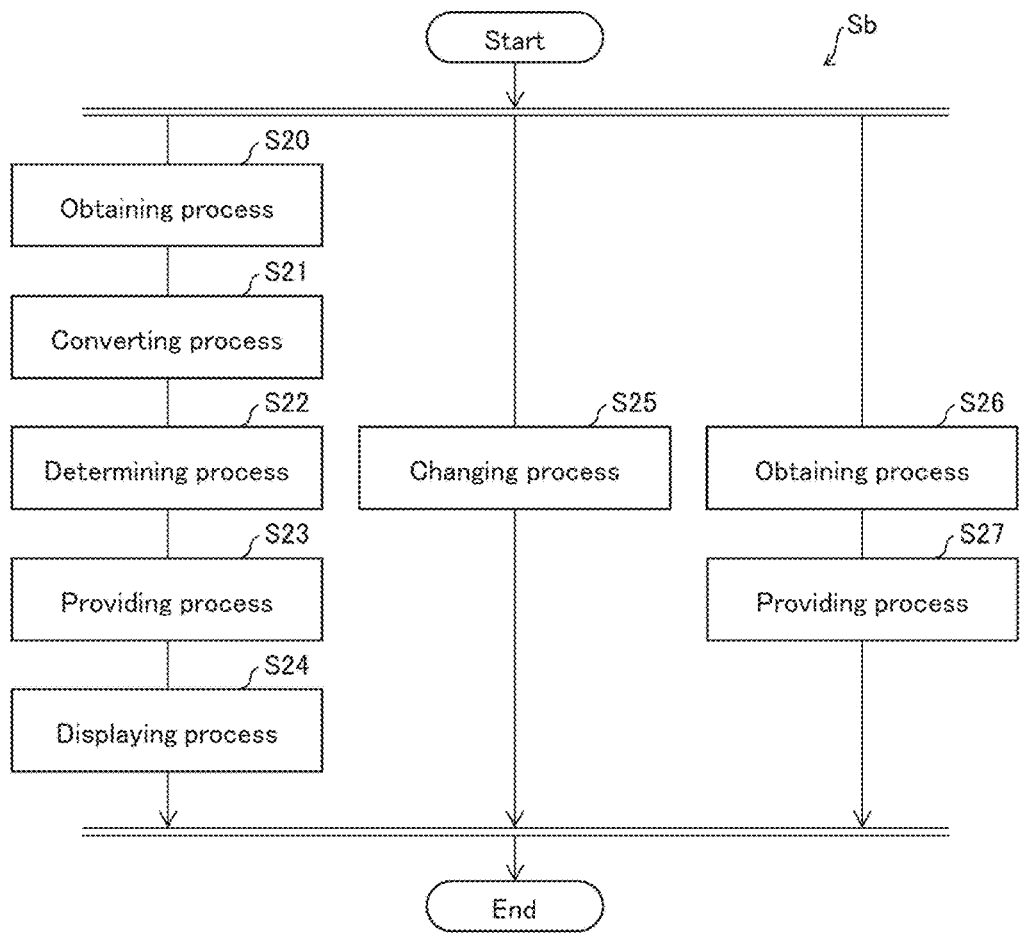
FIG. 8 is a flowchart showing a method for relaying equipment data by the information processing device illustrated in FIG. 1.

A method Sb for relaying equipment data in the information processing device 1 will be described with reference to FIG. 8. FIG. 8 is a flowchart showing a method Sb for relaying equipment data.

The method Sb for relaying equipment data includes an obtaining process S20, a converting process S21, a determining process S22, a providing process S23, and a displaying process S24, as shown in FIG. 8.

The obtaining process S20 is a process in which the processor 11 of the information processing device 1 obtains pieces of equipment data transmitted from the pieces of accessory equipment 4a constituting the accessory equipment group 4. In the obtaining process S20, a piece of accessory equipment 4a1 transmits equipment data to the information processing device 1 periodically or each time the status changes.

The converting process S21 is a process for converting equipment data obtained in the obtaining process S20 into a particular format that is interpretable to the PLC 21 of the main equipment 2. In the converting process S21, the processor 11 of the information processing device 1 extracts status information, digital output and analogue output of the piece of accessory equipment 4a1 from the equipment data obtained in the obtaining process S20. In addition, the processor 11 of the information processing device 1 converts the extracted status information into a format that is interpretable to the PLC 21 of the main equipment 2, and then writes the converted information to the memory 12 as the status information 96 of the equipment data set D2. In addition, the processor 11 of the information processing device 1 converts the extracted digital output and analog output into a format that is interpretable to the PLC 21 of the main equipment 2, and then writes the converted output to the memory 12 as the output information 97 of the equipment data set D2. For example, the processor 11 converts equipment data into a particular format by executing a process of sorting information included in the equipment data (sorting) and/or a process of gathering information included in the equipment data (bit packing). In the method Sb for relaying equipment data, it is possible that the converting process S21 is omitted, and the equipment data is written in the memory 12 without converting the format.

The determining process S22 is a process for determining whether or not the equipment data obtained in the obtaining process S20 satisfies a particular condition. In the determining process S22, the processor 11 of the information processing device 1 (1) compares the digital output and/or analog output of the piece of accessory equipment 4a1 written to the memory 12 as the output information 97 of the equipment data set D2 with the threshold value written to the memory 12 as the monitor information 99 of the equipment data set D2, and (2) writes a comparison result to the memory 12 as the monitor information 99 of the equipment data set D2.

The providing process S23 is a process for providing, to the main equipment 2, equipment data whose format has been converted in the converting process S21. In the providing process S23, the processor 11 of the information processing device 1 reads out information constituting the status information 96, the output information 97, and the monitor information 99 of the equipment data set D2, and writes the read information to the memory of the PLC 21 provided in the main equipment 2. At this time, the processor 11 of the information processing device 1 determines, with reference to the equipment address map M2, which information is to be written to which region of the memory of the PLC 21.

The displaying process S24 is a process for displaying, on the display device 5, equipment data obtained in the obtaining process S20 or information obtained from the equipment data. In the displaying process S24, the processor 11 of the information processing device 1 generates an accessory equipment display screen for displaying equipment data. The processor 11 of the information processing device 1 outputs the generated accessory equipment display screen to the display device 5. A specific example of the accessory equipment display screen will be described later with reference to another drawing.

As illustrated in FIG. 8, the processor 11 of the information processing device 1 may further execute a changing process S25 for changing a condition used for the determining process S22 based on a user operation. In the changing process S25, the processor 11 of the information processing device 1 changes the threshold value stored in the memory 12 as the monitor information 99 of the equipment data set D2 to a value specified by the user.

The processor 11 of the information processing device 1 may further execute an obtaining process S26 and a providing process S27, as illustrated in FIG. 8.

The obtaining process S26 is a process in which the processor 11 of the information processing device 1 obtains a command signal and a command value from the main equipment 2. In the obtaining process S26, the processor 11 of the information processing device 1 reads out the command signal and the command value from the memory of the PLC 21 of the main equipment 2. The processor 11 of the information processing device 1 writes the read command signal and command value to the memory 12 as the input information 98 of the equipment data set D2. At this time, the processor 11 of the information processing device 1 determines, with reference to the equipment address map M2, which information is to be read out from which region of the memory of the PLC 21.

The providing process S27 is a process for providing the command signal and the command value to each piece of the accessory equipment 4a. In the providing process S27, the processor 11 of the information processing device 1 reads out, from the memory 12, information constituting the output information 97 of the equipment data set D2, and transmits the read information to pieces of the accessory equipment 4a.

(Examples of Display Screen)

Figure 9:
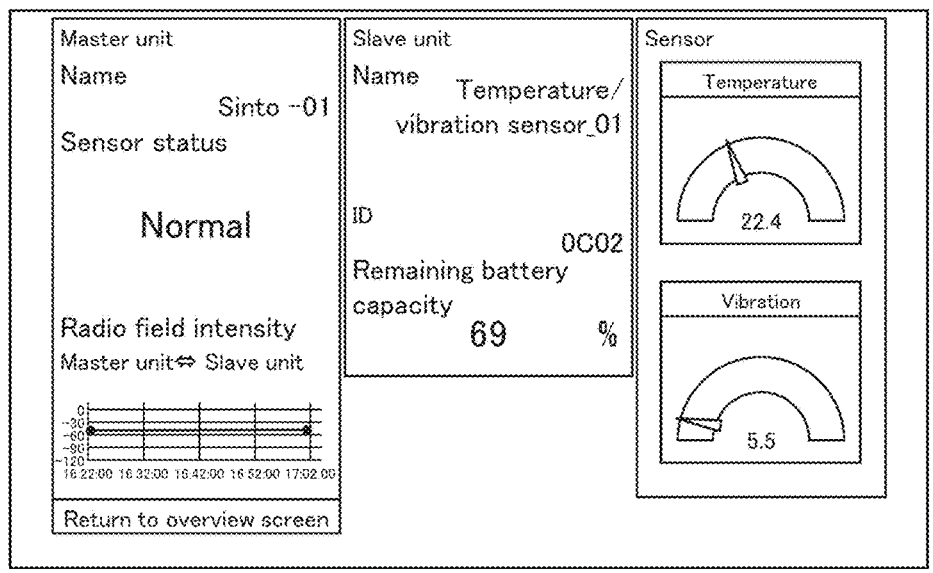
FIG. 9 is a diagram illustrating an example of a sensor display screen which the information processing device causes a display device to display in the method for relaying sensor data shown in FIG. 7.
Figure 10:
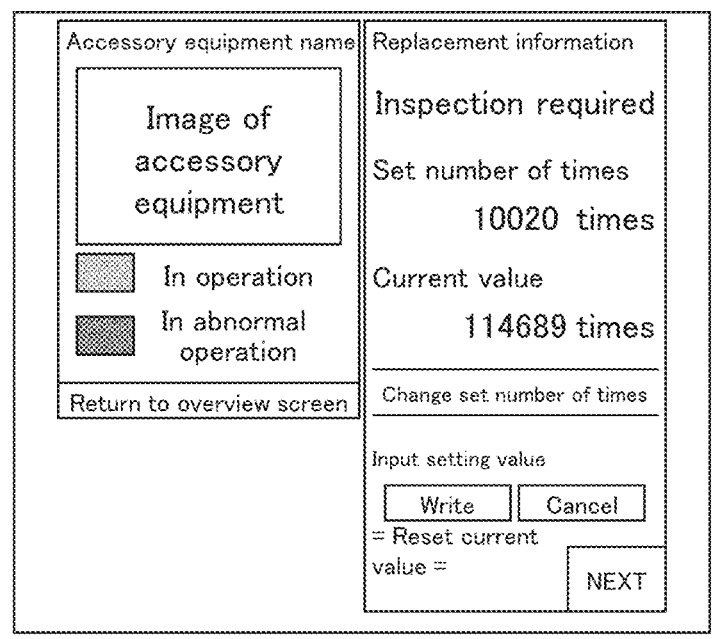
FIG. 10 is a diagram illustrating an example of an equipment display screen which the information processing device causes a display device to display in the method for relaying equipment data shown in FIG. 8.

Examples of display screens which the information processing device 1 causes the display device 5 to display will be described with reference to FIG. 9 and FIG. 10. FIG. 9 illustrates an example of a sensor display screen which the information processing device 1 causes the display device 5 to display in the method Sa for relaying sensor data. FIG. 10 illustrates an example of an equipment display screen which the information processing device 1 causes the display device 5 to display in the method Sb for relaying equipment data.

The sensor display screen illustrated in FIG. 9 indicates information pertaining to a sensor slave unit 3a selected by the user and information pertaining to a sensor master unit 3b that relays sensor data transmitted from that sensor slave unit 3a.

The information pertaining to the sensor slave unit 3a includes configuration information of the sensor slave unit 3a (name and ID in FIG. 9) and status information of the sensor slave unit 3a (remaining battery capacity and radio field intensity in FIG. 9), as well as a detection value of the sensor slave unit 3a (indicators showing temperature and vibration in FIG. 9). The information pertaining to sensor master unit 3b includes configuration information of the sensor master unit 3b (name in FIG. 9), as well as status information of the sensor master unit 3b.

The equipment display screen illustrated in FIG. 10 indicates information pertaining to a piece of accessory equipment 4a selected by the user.

The information pertaining to the piece of accessory equipment 4a includes monitor information of the piece of accessory equipment 4a (replacement information, setting number of times, and current values in FIG. 10), as well as an operation signal of the piece of accessory equipment 4a (indicators showing whether or not the equipment is in operation, and whether or not the equipment is in abnormal operation in FIG. 10). The equipment display screen may also include a user interface for changing the threshold value included in the monitor information, as illustrated in FIG. 10.

(Additional Remarks)

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Information processing device
2: Main equipment
3: Sensor group
3a: Sensor slave unit
3b: Sensor master unit
4: Accessory equipment group
5: Display device

The invention claimed is:

1. An information processing device comprising:
at least one processor, the at least one processor being configured to execute
a first obtaining process for obtaining accessory equipment data transmitted from each piece of accessory equipment included in an accessory equipment group, the accessory equipment data including data indicative of an operation state of each piece of accessory equipment,
a first converting process for converting the accessory equipment data, which has been obtained in the first obtaining process, into a particular format, and
a first providing process for providing, to main equipment, the accessory equipment data whose format has been converted in the first converting process, wherein
the at least one processor is further configured to execute a third obtaining process for obtaining pieces of sensor data transmitted from sensors included in a sensor group;
the at least one processor is further configured to execute a second converting process for converting the pieces of sensor data, which have been obtained in the third obtaining process, into a particular format; and
the at least one processor is further configured to execute a third providing process for providing, to the main equipment, the pieces of sensor data whose format has been converted in the second converting process.

2. The information processing device as set forth in claim 1, further comprising:
a memory storing address information in which each piece of accessory equipment included in the accessory equipment group is associated with a region of the memory of the main equipment, to which accessory equipment data transmitted from the piece of accessory equipment associated with the region of the memory is to be written, and wherein
the at least one processor is configured to execute, in the first providing process, writing accessory equipment data, which has been transmitted from each piece of accessory equipment included in the accessory equipment group, to the region of the memory of the main equipment associated with the piece of accessory equipment in the address information.

3. The information processing device as set forth in claim 1, wherein the at least one processor is further configured to execute
a displaying process for displaying, on a display device, at least one of the accessory equipment data or information obtained from the accessory equipment data.

4. The information processing device as set forth in claim 3, wherein the at least one processor is further configured to execute
a determining process for determining whether or not a number of times a piece of accessory equipment is operated, indicated by the accessory equipment data, exceeds a particular threshold value, and
the at least one processor is configured to cause, in the displaying process, the display device to display a result of the determining process.

5. The information processing device as set forth in claim 4, wherein the at least one processor is further configured to execute a changing process for changing the particular threshold value based on a user operation.

6. The information processing device as set forth in claim 1, wherein
the at least one processor is further configured to execute a second obtaining process for obtaining control data transmitted from the main equipment; and
the at least one processor is further configured to execute a second providing process for providing the control data, which has been obtained in the second obtaining process, to each piece of accessory equipment.

7. An information processing method, the method comprising:
an obtaining process for obtaining, by at least one processor, accessory equipment data transmitted from each piece of accessory equipment included in an accessory equipment group, the accessory equipment data including data indicative of an operation state of each piece of accessory equipment;
a converting process for converting, by the at least one processor, the accessory equipment data, which has been obtained in the obtaining process, into a particular format; and a providing process for providing, by the at least one processor, the accessory equipment data whose format has been converted in the converting process to the main equipment, wherein the at least one processor is further configured to execute a third obtaining process for obtaining pieces of sensor data transmitted from sensors included in a sensor group;

the at least one processor is further configured to execute a second converting process for converting the pieces of sensor data, which have been obtained in the third obtaining process, into a particular format; and the at least one processor is further configured to execute a third providing process for providing, to the main equipment, the pieces of sensor data whose format has been converted in the second converting process.

8. The information processing device as set forth in claim 1, wherein the main equipment is configured to control each piece of accessory equipment in the accessory equipment group.

9. An information processing device comprising:

at least one processor, the at least one processor being configured to execute a first obtaining process for obtaining accessory equipment data transmitted from each piece of accessory equipment included in an accessory equipment group, the accessory equipment data including data indicative of an operation state of each piece of accessory equipment, and a first converting process for converting the accessory equipment data, which has been obtained in the first obtaining process, into a particular format, wherein the at least one processor is further configured to execute a third obtaining process for obtaining pieces of sensor data transmitted from sensors included in a sensor group;

the at least one processor is further configured to execute a second converting process for converting the pieces of sensor data, which have been obtained in the third obtaining process, into a particular format.

\* \* \* \* \*